Dec. 11, 1951     C. B. TOMPKINS     2,577,827
PULSE RECOGNITION DEVICE
Filed Oct. 30, 1945     2 SHEETS—SHEET 1
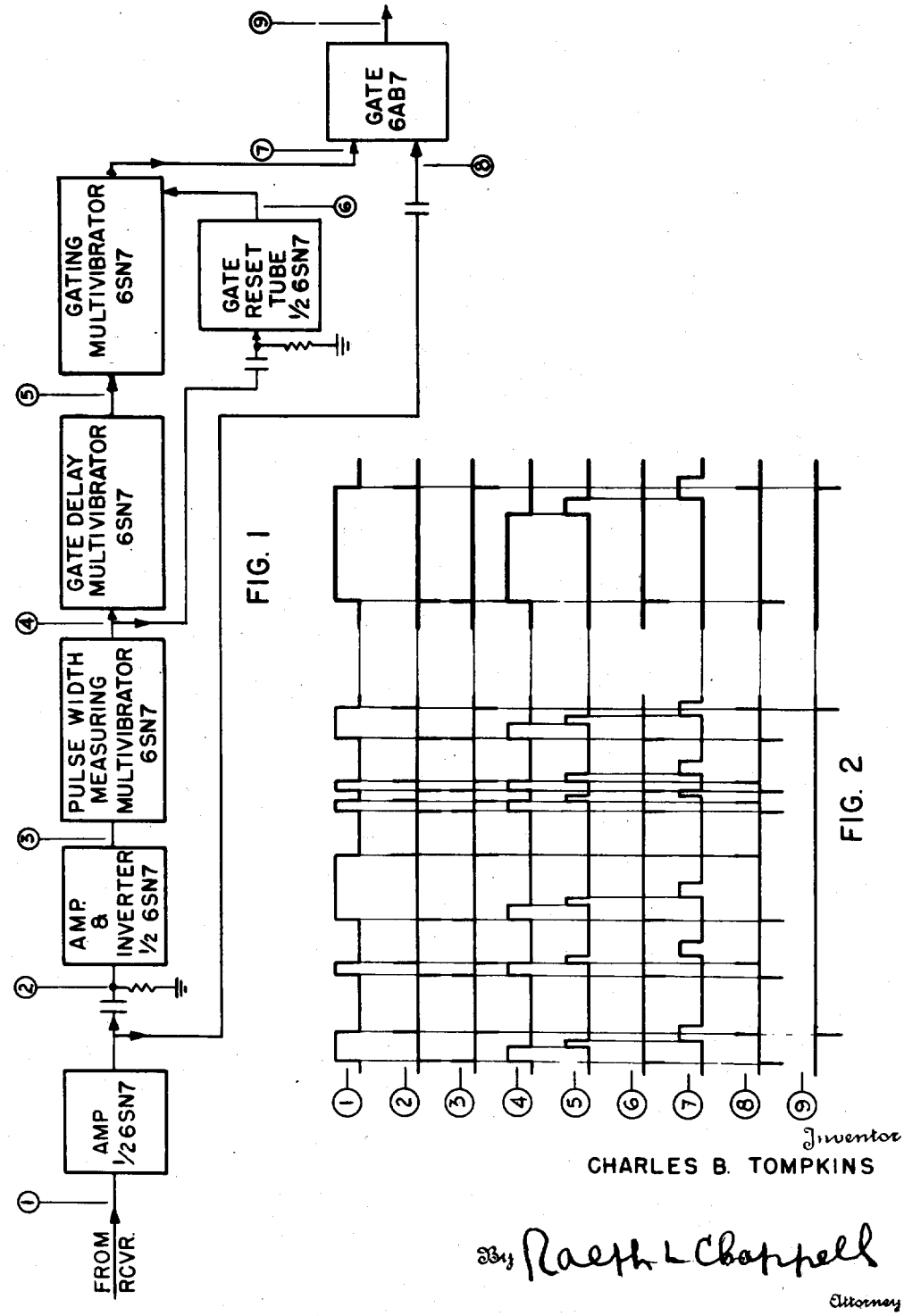
CHARLES B. TOMPKINS

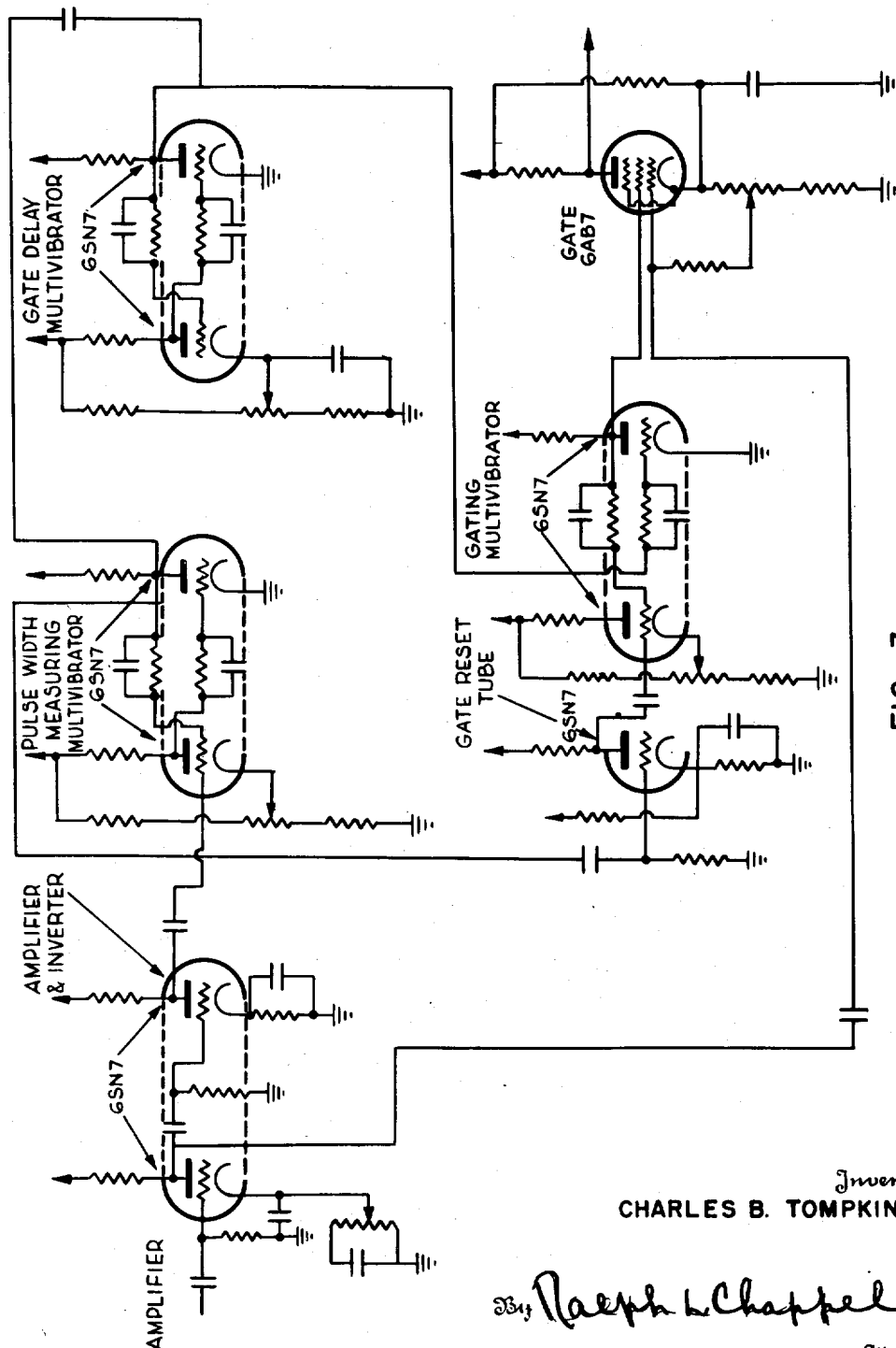

Patented Dec. 11, 1951

2,577,827

UNITED STATES PATENT OFFICE 2,577,827

PULSE RECOGNITION DEVICE

Charles B. Tompkins, United States Navy

Application October 30, 1945, Serial No. 625,673

10 Claims. (Cl. 250—27)

(Granted under the act of March 3, 1883, as amended April 30, 1928; 370 O. G. 757)

This invention relates to a pulse recognition device by which a prearranged pulse, or series of pulses, may be automatically recognized by the equipment.

The principal object of the invention is to provide means whereby a pulse or prearranged signal may be recognized to the exclusion of others, and used to actuate an indicating device.

Another object is to provide means to recognize a prearranged series of such pulses.

A further object is to provide means to measure the duration of pulses or signals.

Other objects will become apparent from the following specification in conjunction with the appended claims.

The device responds to pulses with steep wave fronts and with lengths lying between two predetermined values. It may be made to respond to pulses of approximately one millisecond duration, by being set to limits between .9 and 1.1 milliseconds, although the operation is not restricted to these values since other limits may be used.

The circuit consists of a gate tube which is normally closed or blocked, and which, when opened, passes negative pips from the differentiated trailing edge of a received pulse, and of a series of multivibrators one of which opens the gate tube at the proper time.

The invention may be more easily understood by the following description in connection with the accompanying drawings in which:

Figure 1 is a block diagram of the device.

Figure 2 shows the response at various points in the circuit to various types of signals injected into the circuit.

Figure 3 is a schematic diagram of the circuit employed.

In Figure 1 the leading edge of the impressed signal triggers the pulse width measuring multivibrator, and this multivibrator furnishes a square pulse, the duration of which is a set amount. This amount of time is preferably made equal to the minimum pulse length to be recognized minus the pulse length of the gate delay multivibrator, or else the length of the activating pulse, whichever time is shorter. This multivibrator pulse at its termination triggers the gate delay multivibrator which furnishes a short square pulse the termination of which in turn triggers the gating multivibrator. The length of this pulse is preferably extremely short in comparison to the length of the pulse from the pulse width measuring multivibrator. The gating multivibrator furnishes a square pulse whose duration is the difference between the lengths of the maximum and minimum pulses to be recognized, and the gate is open during the duration of the pulse of the gating multivibrator. The differentiated end of the original pulse is led to the gate and will pass through if the gating multivibrator is furnishing a pulse when it arrives. The gate delay multivibrator delays the opening of the gate long enough to prohibit passage of a signal from a pulse so short that the pulse itself closes the pulse width measuring multivibrator. The gate reset tube serves to close the gating multivibrator when a new pulse actuates the device while the gate is still open. All of these multivibrators are normally stable and non-oscillating except when driven.

In Figure 2 the first pulse introduced is one of the right length to pass through the gate and the diagram shows how a pip is observed at point 9. The right hand portion of Figure 2 shows an enlarged view of a characteristic pulse. The above pulse is passed through two channels to the gate, one being the control channel 2—3—4—5—7, and the other the direct signal channel 8. At 2—3 the pulse is inverted and the leading edge triggers the pulse width measuring multivibrator, which produces a predetermined pulse as at 4. The trailing edge of this pulse triggers the gate delay multivibrator and thereby produces a very short pulse as at 5, which in turn triggers the gating multivibrator by means of its trailing edge. The gating multivibrator then furnishes a square pulse to the gating tube, maintaining it open for a predetermined time, while the trailing edge of the original pulse 1 is allowed to pass through.

The second pulse introduced at point 1 is too short to force a pip through the device, and Figure 2 shows how the pip arrives at point 8 before the gate opening pulse arrives at point 7. The third pulse introduced at point 1 is too long to force a pip through the gate, and this time Figure 2 shows the pip generated by the termination of the pulse arriving at point 8 after the termination of the gate operating pulse at point 7. The next two pulses shown at point 1 in Figure 2 are of such a length that the termination of the second would furnish a pip which would pass through the gate opening by the initiation of the first if the circuit did not provide facilities for closing the gate at the termination of the first pulse, which action is made more reliable by the gate reset tube, which closes the gate at the beginning of the second pulse. Thus it is seen that the first of these two pulses does not influence the action of the circuit on the second pulse. Finally another pulse of the right length passing through the gate is shown entering at point 1.

Figure 3 shows a schematic drawing of the circuit having values which may be calculated and adjusted to permit passage of pulses of duration of approximately one millisecond.

The output of this circuit at point 9 in Figure 1 may be used in any of several ways. It may be connected to a condenser with a leak so that the condenser will fire a Thyratron if, say, five pips strike it within, say, twenty-five milliseconds, and the device may be used to recognize in this way a series of pulses of the chosen length. The output of the gate may be run into any device such as a high resistance meter which will recognize an output, and by tuning the pulse width measuring multivibrator, the lengths of incoming pulses may be measured, whether or not these pulses are regularly recurrent.

The invention described herein may be manufactured and used by or for the Government for governmental purposes without the payment of any royalty thereon or therefor.

What is claimed is:

1. A receiving system for recognizing a signal pulse of time duration having predetermined maximum and minimum limits comprising an input channel for receiving said signal pulse, a normally closed blocking device connected in said input channel, an output channel operatively connected to said input channel when said blocking device is open, means in said input channel for initiating a delayed control pulse therein of a time duration equal to the difference between said maximum and minimum limits in response to the leading edge of said signal pulse, said last-mentioned means being connected to the input of said blocking device, said control pulse operating to open said blocking device to operatively interconnect said output and input channels for the time duration of said control pulse, means in said input channel responsive to the trailing edge of said signal pulse for producing a pulse of shorter time duration than said control pulse in said output channel while the blocking device is open, and gating means for shortening said control pulse when a series of signals is received.

2. A receiving system for recognizing a signal pulse of predetermined time duration comprising an input channel for receiving said signal pulse, a normally closed blocking device connected in said input channel, an output channel operatively connected to said input channel when said blocking device is open, means in said input channel for initiating a control pulse therein of fixed time duration in response to the leading edge of said signal pulse, said last-mentioned means being connected to the input of said blocking device, said control pulse operating to open said blocking device to operatively interconnect said output and input channels for the time duration of said control pulse, means in said input channel responsive to the trailing edge of said signal pulse for producing a pulse of shorter time duration than said control pulse in said output channel while the blocking device is open, and gating means associated with said control pulse initiating means for shortening the time duration of the control pulse when a series of signal pulses is received during said predetermined time duration, whereby the blocking device is closed during reception of the trailing edges of said series of signal pulses.

3. A receiving system for recognizing a signal pulse of predetermined time duration comprising a control channel for receiving said signal pulse, a normally closed blocking device connected in said input channel, a signal channel for also receiving said signal pulse, an output channel operatively connected to said signal channel when said blocking device is open, means in said control channel for initiating a control pulse therein of fixed time duration in response to the leading edge of said signal pulse, said last-mentioned means being connected to the input of said blocking device, said control pulse operating to open said blocking device to operatively interconnect said output and signal channels, means in said signal channel responsive to the trailing edge of said signal pulse for producing a pulse of shorter time duration than said control pulse in said output channel while the blocking device is open, and gating means for shortening said control pulse when a series of signals is received.

4. The receiving system of claim 3 in which gating means associated with said control pulse initiating means is provided for shortening the time duration of said control pulse when a series of signal pulses is received during said predetermined time duration whereby the blocking device is closed during reception in the signal channel of the trailing edges of said series of signal pulses.

5. A receiving system for recognizing a signal pulse of predetermined time duration having maximum and minimum limits comprising an input channel for receiving said signal pulse, a normally closed blocking device connected in said input channel, an output channel operatively connected to said input channel when said blocking device is open, first means in said input channel for initiating a first control pulse therein of fixed time duration in response to the leading edge of said signal pulse, second means in said input channel serially connected to said first means for initiating a second control pulse therein of such time duration that the total time duration of the first and second control pulses equals said minimum limit of time duration of the signal pulse, third means in said input channel serially connected to said second means for initiating a third control pulse therein of a time duration equal to the difference between said maximum and minimum limits of signal pulse time duration, said last-mentioned means being connected to the input of said blocking device, said third control pulse operating to open said blocking device to operatively interconnect said output and input channels, and means in said input channel responsive to the trailing edge of said signal pulse for producing a pulse of shorter time duration than said third control pulse in said output channel while the blocking device is open.

6. The receiving system of claim 5 in which a fourth means is provided for shortening the time duration of the third control pulse when a series of signal pulses is received during said predetermined time duration whereby the blocking device is closed during reception of the trailing edges of said series of signal pulses.

7. A receiving system for recognizing a signal pulse of predetermined time duration having maximum and minimum limits comprising an input channel for receiving said signal pulse, a normally closed blocking device connected in said input channel, an output channel operatively connected to said input channel when said blocking device is open, first means in said input channel for initiating a first control pulse therein of fixed time duration in response to the leading edge of said signal pulse, second means in said input channel serially connected to said first means for initiating a second control pulse therein in response to said first control pulse of such time duration that the total time duration of the first and second control pulses equals said minimum limit of time duration of the signal pulse, third means in said input channel serially connected to said second means for initiating a third control pulse therein in response to the trailing edge of said second control pulse of a time duration equal to the difference between said maximum and minimum limits of signal pulse time duration, said last-mentioned means being connected to the input of said blocking device, said third control pulse operating to open said blocking device to operatively interconnect said output and input channels, and means in said input channel responsive to the trailing edge of said signal pulse for producing a pulse of shorter time duration than said third control pulse in said output channel while the blocking device is open.

8. The receiving system of claim 7 in which a fourth means is provided for shortening the time duration of the third control pulse when a series of signal pulses is received during said predetermined time duration whereby the blocking device is closed during reception of the trailing edges of said series of signal pulses.

9. A receiving system for recognizing a signal pulse of predetermined time duration having maximum and minimum limits comprising an input channel for receiving said signal pulse, a normally closed blocking device, an output channel operatively connected to said input channel when said blocking device is open, a pulse width measuring multivibrator in said input channel for initiating a first control pulse therein of fixed time duration in response to the leading edge of said signal pulse, a gate delay multivibrator in said input channel for initiating a second control pulse therein in response to said first control pulse of such time duration that the total time duration of the first and second control pulses equals said minimum limit of time duration of the signal pulse, a gating multivibrator in said input channel for initiating a third control pulse therein in response to the trailing edge of said second control pulse of a time duration equal to the difference between said maximum and minimum limits of signal pulse time duration for opening said blocking device to operatively interconnect said output and input channels, and means in said input channel responsive to the trailing edge of said signal pulse for producing a pulse of shorter time duration than said third control pulse in said output channel while the blocking device is open.

10. The receiving system of claim 9 in which there is a gate reset tube associated with said gating multivibrator and responsive to said control impulse, said gating tube operating said gating multivibrator to close the blocking device when a series of signal pulses is received during the predetermined time duration, whereby the blocking device will not pass the trailing edges of said series of signal pulses.

CHARLES B. TOMPKINS.

REFERENCES CITED

The following references are of record in the file of this patent:

UNITED STATES PATENTS

| Number | Name | Date |
|---|---|---|
| 2,211,942 | White | Aug. 20, 1940 |
| 2,418,127 | Labin | Apr. 1, 1947 |

FOREIGN PATENTS

| Number | Country | Date |
|---|---|---|
| 528,192 | Great Britain | Oct. 24, 1940 |

Notice

In an interference involving Patent No. 2,577,827, C. B. Tompkins, Pulse recognition device, final judgment adverse to the patentee has been rendered as to claim 5.